March 3, 1936.    R. W. THOMAS    2,032,641
APPARATUS FOR PROPORTIONING AND CONTROLLING THE FEED OF GASES
Filed Aug. 18, 1933    4 Sheets-Sheet 1
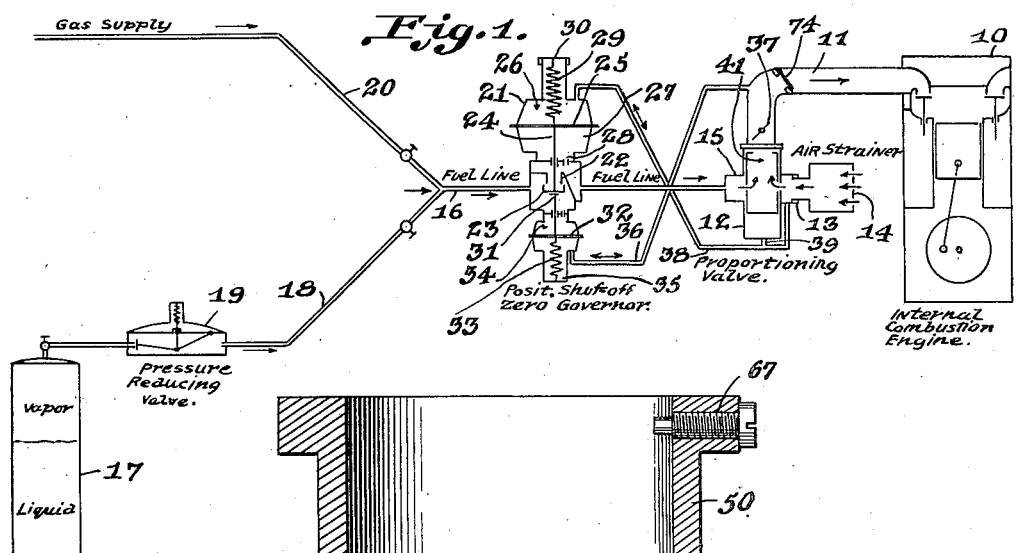
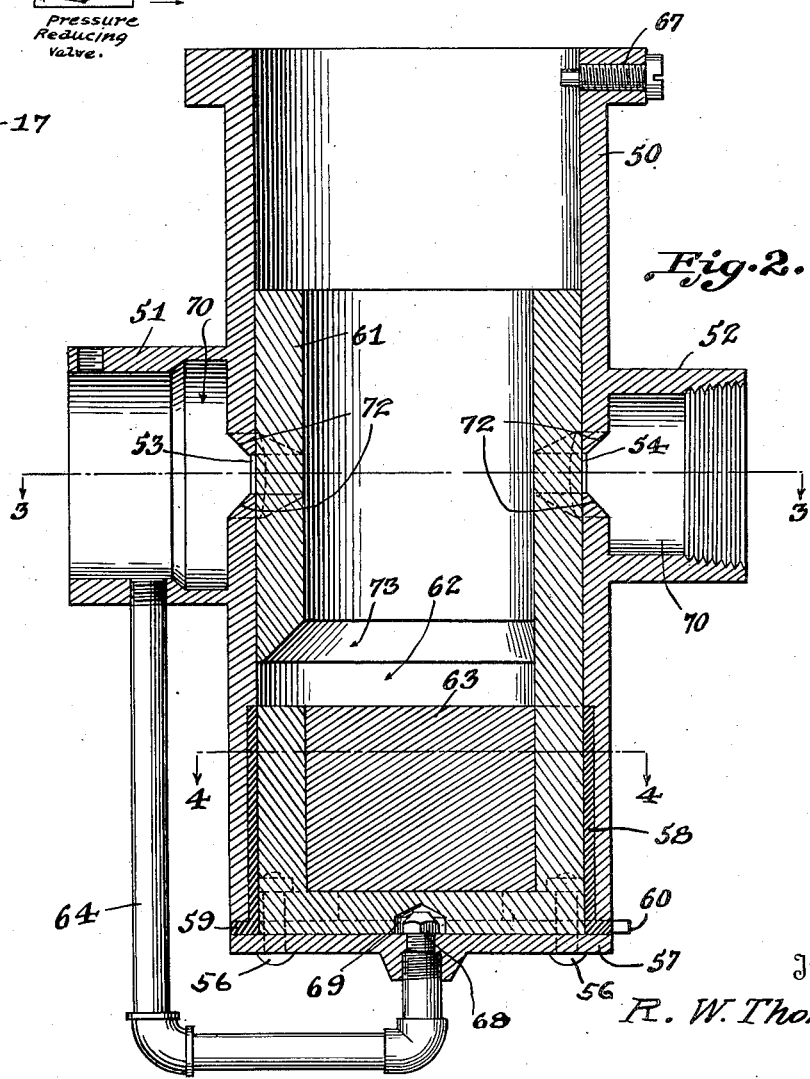
Inventor
R. W. Thomas
By Barry & Cyr
Attorneys

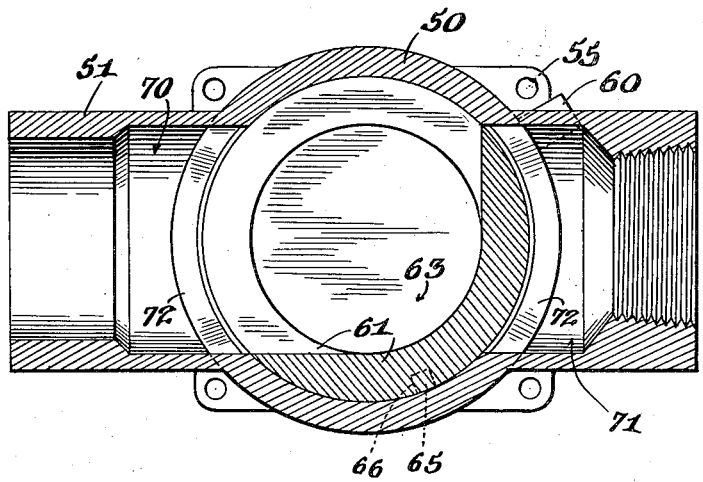
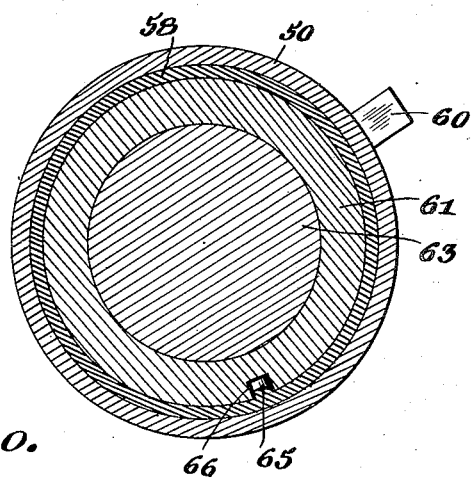
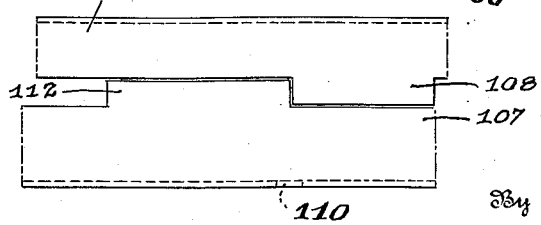

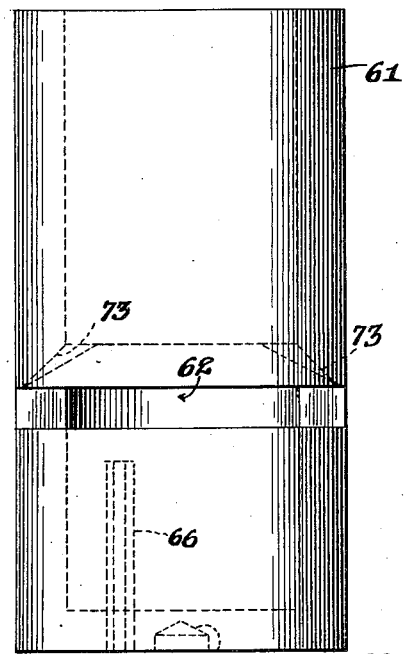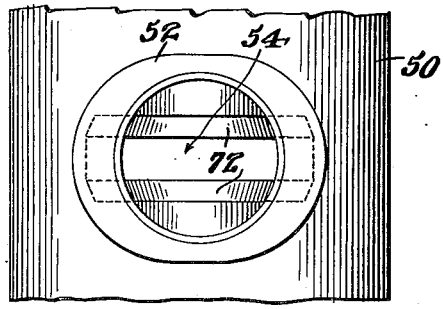

March 3, 1936.  R. W. THOMAS  2,032,641
APPARATUS FOR PROPORTIONING AND CONTROLLING THE FEED OF GASES
Filed Aug. 18, 1933  4 Sheets-Sheet 4
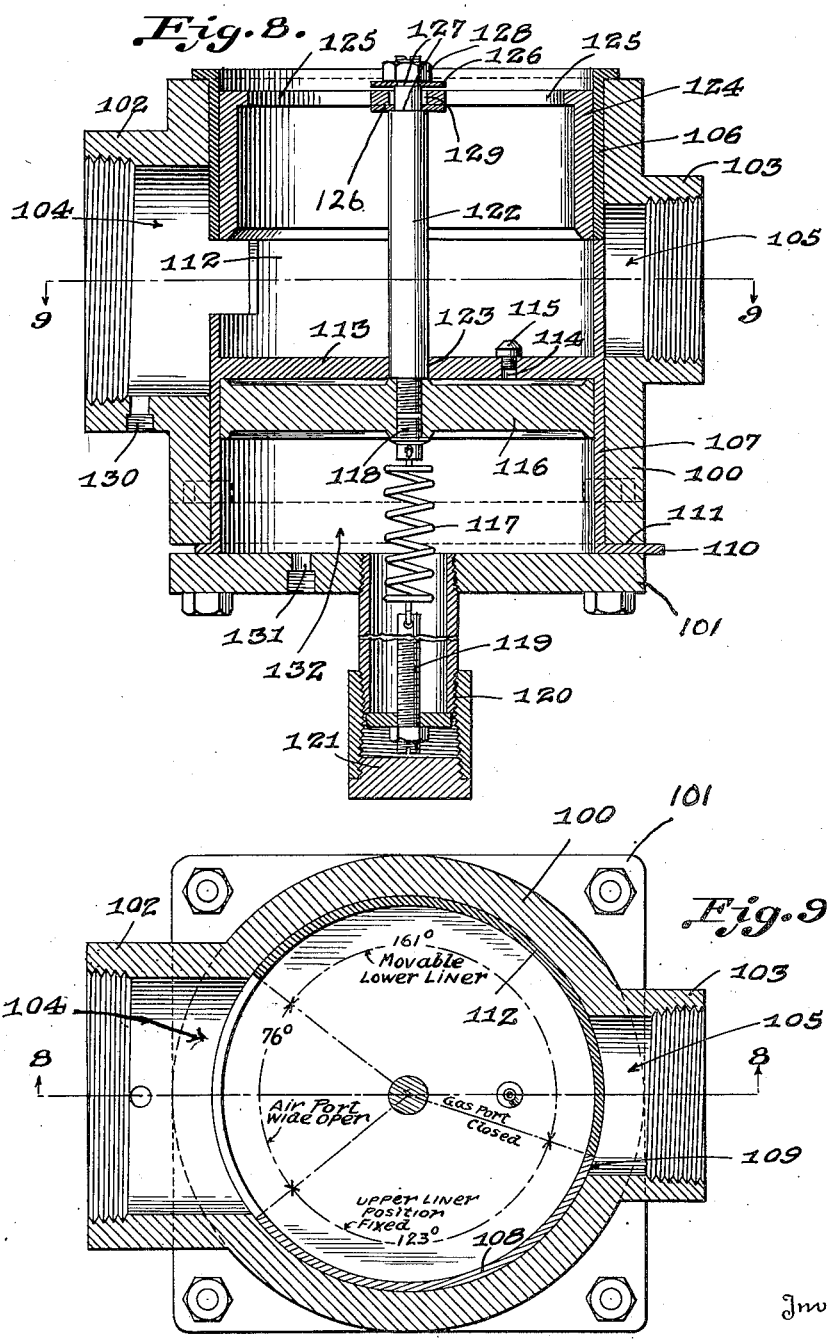

Patented Mar. 3, 1936

2,032,641

UNITED STATES PATENT OFFICE 2,032,641

APPARATUS FOR PROPORTIONING AND CONTROLLING THE FEED OF GASES

Rosswell W. Thomas, Detroit, Mich., assignor to Phillips Petroleum Company, Bartlesville, Okla., a corporation of Delaware Application August 18, 1933, Serial No. 685,788

20 Claims. (Cl. 137—165)

This invention relates to improvements in devices for supplying fuel mixtures to internal combustion engines and the like and more particularly to a simple, accurate and economical gas-air mixing device adapted to use propane, butane, natural gas, manufactured gas and other gaseous fuels in the operation of stationary and automotive internal combustion engines. It can also be used in small gas plants, on block testing internal combustion engines, for proportioning gas-air mixtures in laboratories, small manufacturing plants, on partial or total pre-mix fuel systems, etc. While it is particularly adapted for those purposes, it will be understood from the following description that it may be employed in any environment where it is desired to accurately proportion and mix two streams of gases that are to be fed to any suitable consuming device.

The invention consists in the novel features hereinafter described in detail, illustrated in the accompanying drawings and more particularly pointed out in the appended claims.

In the drawings:

Fig. 1 is a diagrammatic vertical sectional view of the entire apparatus.

Fig. 2 is a vertical sectional view of one form of proportioning valve forming part of the system.

Fig. 3 is a horizontal sectional view of the same taken on the line 3—3 of Fig. 2.

Fig. 4 is a similar view taken on the line 4—4 of Fig. 2.

Fig. 5 is an elevational view of the piston of this valve.

Fig. 6 is an elevational view of one of the intake ports of the valve.

Fig. 7 is a vertical sectional view of another form of the valve.

Fig. 8 is a vertical sectional view partly in elevation of a preferred embodiment of my proportioning valve.

Fig. 9 is a horizontal sectional view of the same taken on line 9—9 of Fig. 8.

Fig. 10 is a development of the liners used specifically with the construction shown in Fig. 8 and which may be also employed with the construction shown in Fig. 7.

Referring first to Fig. 1, the numeral 10 designates an internal combustion engine having an intake manifold 11 provided with a proportioning valve 12 to which air is fed by an air conduit 13 which may be provided with an air strainer 14. The valve also has a fuel gas conduit 15 which is connected to a fuel feeding pipe 16 which may receive fuel from a pressure container 17 by means of a pipe 18 having a conventional pressure reducing valve 19 interposed therein. Instead of taking gas from a container such as 17, the gas may be supplied by a pipe 20. In other words by means of pipes 18 or 20 the gaseous fuel can come from a pipe line, liquefied petroleum gas tank, gas producer or any other source. Regardless of the source of the gaseous fuel, I prefer to interpose in the line 16, a positive shut-off zero governor 21 which will have a port 22 for feeding the gas from the upstream side of the governor to the downstream side of the latter. A valve head 23 controls the passage of the fuel through this port and this head may be suspended from a rod 24 that is connected to the central portion of a movable partition, such as a diaphragm 25. This diaphragm divides the upper portion of the governor into an upper gas tight chamber 26 and a lower chamber 27 that communicates by an orifice 28 with the port 22. As the diaphragm 25 is imperforate, it segregates the upper from the lower chamber.

A coil spring 29 has its upper end adjustably connected at 30 to the top of the governor casing, and its lower end secured to the diaphragm so as to support the valve head in a floating position in which it will normally allow gas to pass through the port 22.

Below the valve head I arrange a shut-off rod 31 which rests on a movable partition, such as a diaphragm 32, that is urged upwardly by means of a spring 33 acting to hold the valve head in closed position at all times when the tendency of the spring is not overcome. The part 32 is also imperforate and divides the lower portion of the governor casing into an upper chamber 34 and a lower chamber 35. The upper chamber is in constant communication with the pipe 16, while the lower chamber, by means of a tube 36, is in constant communication with the intake manifold either posterior or anterior to the throttle valve 37. Another tube 38 places the chamber 26 in constant communication with the air intake conduit 13 and this tube has a branch 39 which communicates with a chamber 40 positioned below the closed bottom of the plunger or piston of the proportioning valve.

From the foregoing it will be noted that the equalizing line or tube 38 from the upstream side of the air orifice of the proportioning valve connects with the lower side of the differential piston 41 and also with the chamber 26 above the upper diaphragm of the zero governor, the object being to maintain whatever pressure value exists on the upstream side of the air port of the proportioning valve, not only below the differential piston of the latter but also on the upstream side of the gas port, thereby permitting accurate proportioning and allowing the equipment to operate at any desired pressure value without reference to atmosphere. As an example of what might be accomplished in this regard, the internal combustion engine 10 can be supercharged by means of a blower or compressor pushing air through the conduit 13 at a super-atmospheric pressure value, and the device will function satisfactorily provided the gas through pipe 16 is supplied at a slightly higher pressure than the air pressure. Furthermore the tube 38 causes the device to properly function even in case a sub-atmospheric pressure should exist in the conduit 13.

The positive shut-off feature of the zero governor is very practical and particularly advantageous, as it utilizes through the instrumentality of the tube 36, sub-atmospheric conditions in the intake manifold to pull down on the movable partition 32 against the tension of the spring 33, thereby taking the artificial loading off the zero governor main valve 23 and allowing the latter to open. In actual practice the spring 33 will keep the valve 23 tightly against its seat, when the engine is not operating. When, however, the engine crank shaft is rotated, subatmospheric pressure will result in the manifold above or below the throttle 37, and such subatmospheric pressure will be transferred through the tube 36 to the lower side of the diaphragm 32, pulling the latter downward against its spring and permitting the governor to function in a normal manner. This auxiliary closing device is held away from the valve head as long as the engine operates, but when the engine is stopped for any reason, it is unnecessary to manually shut off the fuel supply, as atmospheric pressure will again occur in the manifold and the spring 33 will then cause the closing of the valve head 23.

While the zero governor may be employed in connection with any type of proportioning valve to which it is applicable, I prefer to use the same in connection with the proportioning valves shown in Figs. 2 to 7 inclusive; and in the embodiment of the proportioning valves illustrated in Figs. 1 to 6 inclusive, 50 designates a tubular cylindrical valve casing having an air intake sleeve 51 and a gas intake sleeve 52 which communicate respectively with an air intake port 53 and a gas intake port 54. As best shown in Fig. 3, the casing is provided at its lower end with apertured ears 55 to receive bolts 56 (Fig. 2) employed in securing a bottom plate 57 to the lower end of the casing. A liner sleeve 58 is arranged in the casing below the ports and has a flange 59 at its lower edge that is adjustably clamped in place between the lower end of the casing and the plate. The flange of the liner has a projecting arm 60 which may be rotated when the bolts 56 are loosened, for the purpose of rotatably adjusting the liner.

The piston or plunger of this proportioning valve is shown at 61 and it is of tubular form from its intake port 62 to its upper end but below the port it is closed and provided with weight mass 63. A tube 64 in this form of the invention corresponds with the tube 39 of Fig. 1 for the purpose of placing the chamber below the piston in communication with the air sleeve 51.

As shown in Fig. 4, the liner is provided with an inwardly extending pin 65 which enters a groove 66 extending lengthwise of the piston, and it will be understood that when the liner is rotated by operating the handle 60 the piston will also be turned. However, regardless of the position of the pin 65 the piston can rise and fall and will be prevented from rotating by said pin when the liner flange 59 is clamped in a stationary position.

Any suitable form of stop 67 may be placed at the upper end of the valve casing to limit the upward movement of the piston.

This form of proportioning valve is designed for use with internal combustion engines of either stationary or portable character, as well as for other uses where accurate proportioning of various gases is desired, and it has proved quite practical when used with different types of automobile engines. In operation, it may be stated that vertical movement of the piston 61 from the bottom of its casing for the first portion of its movement places it in position where its port 62 starts to coincide with the lower edges of the ports 53 and 54, in the cylinder wall. In this form of the invention, each of the inlet ports 53, 54 occupies a 90 degree arc on the inside diameter of the casing, while the port 62 of the piston extends for 180 degrees. However, all of the ports are of the same height. When the piston rises to a certain height (to overcome the lap which is provided to avoid leakage of gas either to the outlet or to the air inlet when there is no demand for mixture on the system) the piston port 62 is in registry exactly with the cylinder ports 53, 54 (as far as vertical travel is concerned) and the valve supplies its maximum possible output at the predetermined pressure differential across the ports. For any less than this full load condition the piston will drop a corresponding amount to close both ports 53, 54 proportionately, thereby adjusting itself to maintain the predetermined differential.

A screw 68 at the bottom of the casing is provided with a small drilled hole, which can be drilled to the proper size to prevent violent up and down movements of the piston, as might be encountered when the device is mounted on an automotive vehicle and traveling over rough roads. To insure the pressure under the piston being the same as the pressure on the upstream sides of the ports, the tubing 64 is used. Consequently if an air cleaner is used on the air inlet 51 and the pressure on the upstream side of the air orifice 53 happens to be below atmospheric, as might be the case with any appreciable pressure drop through the filter or other device, this same reduced pressure will also be present below the piston, thereby insuring a fixed differential of predetermined amount across the air port.

In order that the piston, when in seated position, will not interfere with the action of the tube 64, the piston is provided at its bottom with a counter-sink 69 to accommodate the apertured screw 68.

It will be obvious that with the piston shown in the position illustrated in the Fig. 3, that the gas inlet port is entirely closed off regardless of the vertical position of the piston, whereas the air port is wide open; therefore, the fluid discharged through the top of the casing would be 100% air. If the piston is rotated 90 degrees in a clock-like direction, no air would be admitted and 100% gas would be handled. Intermediate positions result in varying proportions of air and gas, depending upon the angular position of the piston with respect to the corresponding port openings and depending also upon the specific gravity of the gases being handled. It will be seen, however, that any desired mixture from 100% of one gas to 100% of the other can be obtained by the simple rotational adjustment. As heretofore described, the pressure across these orifices is maintained uniformly by upward and downward movement of the piston under the influence of the differential across the orifices. The system is gas tight at the lower end of the cylinder but the liner can be rotatively adjusted without affecting the joint, even when the unit is in operation.

In this particular embodiment of the proportioning valve the ports 53 and 54 are relatively short in height as compared with their angular width, as this modification was designed for use with liquefied petroleum gases, where the ratio of air to gas is very high. In the case of propane about 23 parts of air can be used to one part of gas for a complete fuel mixture to be supplied to an internal combustion engine. This means that the piston 61 will be rotated clockwise from its shown position, only a very small amount (approximately 4°). The ratio of length to width of the air port is thus, in this particular case, practically identical with that of the gas port, although the longer dimension of the gas port is vertical and the longer dimension of the air port is horizontal. For another air-gas ratio it may be advisable to have the ports relatively narrow with respect to the arc of the cylinder and comparatively high in the direction of axial movement of the piston.

A reasonable sized "wind box" or chamber 70, 71 is provided on the upstream side of the air and gas orifices respectively, in that although these chambers are only approximately as wide in the direction of arc, as the ports, they are considerably higher than said ports, therefore, very good orifice flow conditions are obtained, both on the upstream and downstream side of the orifices. This condition is also improved by converging the upper and lower surfaces of the ports as shown at 72 and by inclining the upper surface of the cylinder port upwardly and inwardly as at 73.

Another feature of this device is that it is rugged and will withstand back-fires which occasionally occur in the intake manifolds of internal combustion engines. If a back fire occurs, the piston will of course be forced downward to the bottom of the cylinder, which is made strong enough to withstand a considerable blow in this respect. The air and gas ports will be closed off by this movement of the piston so that the force of the explosion is not communicated to the air intake or the gas intake, therefore, the air cleaner, if any, the gas regulator and other delicate parts of the system will not be damaged. An outwardly opening check valve 74 (Fig. 1) can be used on the intake manifold to provide a vent opening for any pressures which might be built up by back-fires and the like.

The proportioning valve illustrated in Figs. 2 to 6 inclusive, is of the gravity closed type, and as it is sometimes necessary to place the valve in a position where the piston cannot close by gravity, I have devised the structure shown in Fig. 7 for such a situation. This valve is of the spring controlled differential, piston free to rotate type, and it is probably the preferred embodiment of the invention and includes a "full floating" piston, i. e., the piston is free to rotate, with the differential controlled by spring tension rather than by the weight of the piston itself.

In this embodiment, the cylinder 75 has an air intake 76 and a gas intake 77 which communicate respectively with ports 78 and 79 formed by the walls of a rotatable liner 80 and a stationary liner 80a. The position of the ports relatively to the intakes may be adjusted by operating screws 81 which are threaded into a suitable projection on a flange 82 at the lower end of the cylinder and abut against an arm 83 which projects from the rotatable liner. A bottom plate 84 may be secured to the wall of the casing in the same manner as shown in Figs. 2 to 6 inclusive, and such plate will have a nipple 85 closed by a threaded cap 86. The piston 87 in this embodiment may consist of a central sleeve 88 having a perforated top 89 from which depends an annular skirt 90. The lower end of the sleeve is united with a solid bottom 91 from which extends an upstanding annular wall 92, the upper edge of which is spaced from the lower end of the skirt 90 to provide an annular piston port 93.

A coil spring 94 is housed within the sleeve and has its upper end secured to the top of the piston and its lower end connected to the cap 86. By adjusting the latter the tension of the spring may be varied.

A tube 95 places the air intake in communication with the chamber 96 below the piston.

This form of the invention permits the valve to be mounted in any desired position by merely changing or adjusting the spring, so that the spring tension either overcomes or augments the weight of the piston which may or may not be effective, depending upon the position of the valve. The spring controlled feature also has the advantage of permitting the differential across the ports to be changed at the will of the operator, within a resonable range. Piston rings 97 are positioned in suitable grooves in the skirt 87 and wall 92 of the piston to avoid leakage past the upper and lower parts of the piston and permit the latter to have a sufficiently loose fit in the liner to prevent any possibility of sticking or binding. Of course the rings will also keep any foreign material from falling downwardly very far between the piston and liner, and in addition they will set up sufficient friction to eliminate chattering or violent pulsations of the piston which may sometimes be set up by irregular demands, etc. The piston rings and ring grooves are, of course, optional.

It is obvious on this type of valve that the lower edge of the skirt of the piston forms the upper margin of the proportioning ports for both air and gas and the annular opening in the piston wall can therefore be wider than the height of the ports if desired as the upper end of the lower part 92 of the piston has nothing to do with the proportioning.

The equalizing line 95 is important for accuracy of proportioning particularly if an air cleaner or other restriction is used on the air inlet, in which case the upstream side of the air port would not be under exactly atmospheric pressure. This equalizer also permits the use of the valve at sub- or super-atmospheric pressure.

In the preferred embodiment of the proportioning valve, illustrated in Figs. 8 to 10 inclusive, the numeral 100 designates a cylindrical valve casing, closed at one end by a plate 101 and open at its opposite end for the discharge of the mixture. The air intake is shown at 102 and the gas intake at 103 and, of course, they are provided respectively with an air port 104 and a gas port 105. In this form of the invention an upper liner 106 and a lower liner 107 are employed. The upper liner is stationary and it is secured to the casing by any suitable means. This liner, as best shown in Figs. 9 and 10, has a depending segment 108 which may cut off a portion of the gas port as shown at 109.

The lower liner may be turned by means of a handle 110 which projects through a space 111 at the lower end of the casing, and this liner has an upstanding segment 112 which overlaps the segment 108 and is adapted to cooperate with the air and gas ports for varying the ratio of air and gas in the mixture.

A partition 113 extends across the lower or movable liner and is imperforate with the exception of holes 114 and 123 the former of which receives a bleed spud 115, through which reduced pressure exerted in the outlet end of the valve casing may be imparted to a piston 116. This piston is moved in one direction by any suitable loading means such as a spring 117 which has one of its ends connected to the piston by a screw 118 and its opposite end secured to an adjusting screw 119 positioned in a sleeve 120 that is secured to the plate 101 and has its outer end closed by a plug 121. A piston rod 122 has one of its ends secured to the piston and is slidably guided by a port 123 in the partition, and the upper end of the rod carries a volume sleeve 124. This sleeve is preferably in the form of an inverted cup with apertures 125 in its head to permit the passage of the mixture. The volume sleeve is connected to the rod by any suitable kind of a loose joint to permit self alignment of the sleeve for example, the head of the sleeve may be loosely confined between washers 126 which rest on shoulders 127 on the rod and may be secured in position by a nut 128. As the opening 129 in the head is larger than the juxtaposed portion of the rod, it is obvious that the volume sleeve can automatically align itself even though the rod is slightly out of alignment.

At this point it will be noted that the volume sleeve takes care of the volume of air and gas mixture and cooperates with the segment 112 which controls the ratio of the air and gas. An aperture 130 in the air intake and an aperture 131 in the bottom of the casing permit the air intake and the chamber 132 of the casing to be placed in constant communication as by the pipe 39 in Fig. 1 or the pipe 64 in Fig. 2.

With further reference to Fig. 8 it may be stated that the partition 113 serves not only as a guide for the piston rod but also restricts the flow to and from the space above the piston 116 by virtue of the restricted orifice in the spud 115, thereby preventing violent fluctuations in pressure or flow in the mixture outlet from seriously affecting the position of the piston itself. Some surges or pulsations are sometimes set up in the mixture outlet, if the valve is connected to the intake of a compressor or the intake of an internal combustion engine. The partition and the restricted orifice are therefore very valuable in damping or eliminating the effect of such pulsations on the differential piston. This permits accuracy of proportioning by resulting in more stable conditions in the valve and avoids rapid changes in the mutual sizes of the gas and air ports.

The travel limits of the moving parts (Figs. 8, 9 and 10) are preferably restrained by the piston 116 contacting the lower surface of the partition 113 on the upward movement and by striking the plate 101 on the downward movement. I prefer that the volume sleeve 124 be so positioned with relation to the piston that it will not touch the partition 113 in its lowest position or project from the upper liner in its uppermost position.

I have found that the function of variation in ratio of air to gas, at the will of the operator, can best be performed by making this function independent of the piston. In other words, it is simpler, cheaper and more fool-proof to arrange the ports in the walls of the cylinder or the cylinder liners so that a suitable adjustment will increase the size of the air port while it is decreasing the size of the gas port, or vice versa—or, if so desired the air port can be left fixed in size and the gas port can be varied from 0 to 100% of its capacity, thereby permitting the desired mixture ratio to be set and maintained, or vice versa the gas port can be of constant size and the air port can be variable in size from 0 to 100% or throughout any desired range.

In the drawings I have illustrated numerous ways of accomplishing these changes, however, the preferred construction is illustrated in Figs. 8 to 10 inclusive.

The other fundamental function of the valve, which is, of course, separate and distinct from the ratio function, is the volume control arrangement, that is, the provision for accommodating variable loads or variable volumes and still maintaining a constant predetermined ratio of gas and air. This is preferably accomplished by the volume sleeve 124 and its control piston 116 shown in Fig. 8.

The valves disclosed herein are of course capable of being used at atmospheric pressure, sub-atmospheric pressure or super-atmospheric pressure levels and the fluids being proportioned can either be drawn through the valve or can be forced through, the pressure drop being equal to approximately the differential for which the valve is loaded or adjusted. While I have described the proportioning valves for use with gases, it is manifest that they may also be used for proportioning liquids or in fact in any environment where it is desired to proportionately mix a plurality of fluids.

While I have disclosed what I now consider to be some preferred embodiments of the invention, I am aware that changes may be made in the details disclosed without departing from the spirit of the invention as expressed in the claims.

What is claimed and desired to be secured by Letters Patent is:

1. A proportioning valve comprising a cylinder having air and gas inlet ports and a mixture outlet, means including a piston member in the cylinder adapted to cooperate with said ports for feeding air and gas from the ports to the outlet, said means being closed at one end, means for establishing differential pressures at opposite sides of said closed end for moving said piston member axially of said cylinder, a liner member in the cylinder and arranged exteriorly of the piston member, means for moving one of said members to vary the volume of air and gas passing through said ports, and other means for moving one of said members to vary the ratio of air and gas passing through said ports.

2. A proportioning valve comprising a cylinder having air and gas inlet ports and a mixture outlet, means including a piston member in the cylinder adapted to cooperate with said ports for feeding air and gas from the ports to the outlet, said means being closed at one end, means for establishing differential pressures at opposite sides of said closed end for moving said piston member axially of said cylinder, a liner member in the cylinder and arranged exteriorly of the piston member, means for moving one of said members to vary the volume of air and gas passing through said ports, each cylinder port being elongated circumferentially of the cylinder, and other means for moving one of said members to vary the ratio of air and gas passing through said ports.

3. A proportioning valve comprising a cylinder having air and gas inlet ports and a mixture outlet, means including a piston member in the cylinder adapted to cooperate with said ports for feeding air and gas from the ports to the outlet, said means being closed at one end, means for establishing differential pressures at opposite sides of said closed end for moving said piston member axially of said cylinder, a liner member in the cylinder and arranged exteriorly of the piston member, means for moving one of said members to vary the volume of air and gas passing through said ports, each of the cylinder ports being elongated circumferentially of the cylinder and having converging upper and lower surfaces, and other means for moving one of said members to vary the ratio of air and gas passing through said ports.

4. A proportioning valve comprising a cylinder having air and gas inlet ports and a mixture outlet, means including a piston member in the cylinder adapted to cooperate with said ports for feeding air and gas from the ports to the outlet, said means being closed at one end, means for establishing differential pressures at opposite sides of said closed end for moving said piston member axially of said cylinder, a liner member in the cylinder and arranged exteriorly of the piston member, means for moving one of said members to vary the ratio of air and gas passing through said ports, the last mentioned means including a handle projecting exteriorly of the cylinder.

5. A proportioning valve comprising a cylinder having air and gas inlet ports and a mixture outlet, means including a piston member in the cylinder adapted to cooperate with said ports for feeding air and gas from the ports to the outlet, said means being closed at one end to permit pressure conditions created in the outlet to move said piston member in one direction, a liner member in the cylinder and arranged exteriorly of the piston member, means for moving one of said members to vary the ratio of air and gas passing through said ports, and a passageway placing the air intake port in communication with the interior of the cylinder at one side of the piston member.

6. A proportioning valve comprising a cylinder having air and gas inlet ports and a mixture outlet, means including a piston member in the cylinder adapted to cooperate with said ports for feeding air and gas from the ports to the outlet, said means being closed at one end, means for establishing differential pressures at opposite sides of said closed end for moving said piston member axially of said cylinder, a liner member in the cylinder and arranged exteriorly of the piston member, means for moving one of said members to vary the ratio of air and gas passing through said ports, and means for moving the piston member in the opposite direction.

7. A proportioning valve comprising a cylinder having air and gas inlet ports and a mixture outlet, means including a volume sleeve and a piston member in the cylinder adapted to cooperate with said ports for controlling the volume of air and gas fed from the ports to the outlet, means for establishing differential pressures at opposite sides of the piston member for controlling axial movement of said piston member, a liner member in the cylinder arranged exteriorly of said means, and means for moving said liner member to vary the ratio of air and gas passing through said ports.

8. A proportioning valve comprising a cylinder having first and second intake ports and a mixture outlet, floating means in the cylinder for varying the volume of fluids passing through the ports to said outlet, means for establishing differential pressures at opposite sides of the floating means for controlling axial movement of said floating means, means for positively moving the floating means in one direction, and a movable liner positioned between the floating means and the cylinder for varying the ratio of fluids entering said ports.

9. A proportioning valve comprising a cylinder having air and gas inlet ports and a mixture outlet, means including a piston member in the cylinder adapted to cooperate with said ports for feeding air and gas from the ports to the outlet, said means being closed at one end, means for establishing differential pressures at opposite sides of said closed end for moving said piston member axially of said cylinder, a liner member in the cylinder and arranged exteriorly of the piston member, means for moving one of said members to vary the ratio of air and gas passing through said ports, the last mentioned means serving to rotate said liner member but the piston member being free to move axially relatively to the liner member for varying the volume of air and gas passing through said ports.

10. A proportioning valve comprising a cylinder closed at one end and provided at its opposite end with a mixture outlet, an air intake and a gas intake mounted on the wall of the cylinder, an air intake port leading from the air intake into the cylinder and a gas intake port leading from the gas intake into the cylinder, means movable in the cylinder and having a piston juxtaposed to the closed end of the cylinder, said piston being adapted to move in one direction due to pressure conditions created in said outlet and said means cooperating with the cylinder ports for controlling the volume of air and gas fed from the ports to the outlet, and a rotatable liner cooperating with said means and cylinder for varying the ratio of the air and gas passed through said ports.

11. A proportioning valve comprising a cylinder closed at one end and provided at its opposite end with a mixture outlet, an air intake and a gas intake mounted on the wall of the cylinder, an air intake port leading from the air intake into the cylinder and a gas intake port leading from the gas intake into the cylinder, means movable in the cylinder and having a piston juxtaposed to the closed end of the cylinder, said piston being adapted to move in one direction due to pressure conditions created in said outlet and said means having a wall cooperating with the cylinder ports for controlling the volume of air and gas fed from the ports to the outlet, a rotatable liner cooperating with said wall and cylinder for varying the ratio of the air and gas passed through said ports, and a passageway placing the interior of the cylinder between said closed end and piston in communication with the air intake.

12. A proportioning valve comprising a cylinder closed at one end and provided at its opposite end with a mixture outlet, an air intake and a gas intake mounted on the wall of the cylinder, an air intake port leading from the air intake into the cylinder and a gas intake port leading from the gas intake into the cylinder, means movable in the cylinder and having a piston juxtaposed to the closed end of the cylinder, said piston being adapted to move in one direction due to pressure conditions created in said outlet and said means having a wall cooperating with the cylinder ports for controlling the volume of air and gas fed from the ports to the outlet, a rotatable liner cooperating with said wall and cylinder for varying the ratio of the air and gas passed through said ports, and means for positively moving the piston in the opposite direction.

13. A proportioning valve comprising a cylinder closed at one end and provided at its opposite end with a mixture outlet, an air intake and a gas intake mounted on the wall of the cylinder and an air intake port leading from the air intake into the cylinder and a gas intake port leading from the gas intake into the cylinder, means movable in the cylinder and having a piston juxtaposed to the closed end of the cylinder, said piston being adapted to move in one direction due to pressure conditions created in said outlet and said means having a wall cooperating with the cylinder ports for controlling the volume of air and gas fed from the ports to the outlet, a rotatable liner cooperating with said wall and cylinder for varying the ratio of the air and gas passed through said ports, and a spring for moving the piston in the opposite direction.

14. A proportioning valve comprising a cylinder closed at one end and provided at its opposite end with a mixture outlet, an air intake and a gas intake mounted on the wall of the cylinder, an air intake port leading from the air intake into the cylinder and a gas intake port leading from the gas intake into the cylinder, means movable in the cylinder and having a piston juxtaposed to the closed end of the cylinder, said piston being adapted to move in one direction due to differences in pressure between said intakes and outlet and said means having a wall cooperating with the cylinder ports for controlling the volume of air and gas fed from the port to the outlet, a rotatable liner cooperating with said wall and cylinder for varying the ratio of the air and gas passed through said ports, said means consisting of the piston and a cup inverted toward the piston, the edge of the cup and piston being spaced apart.

15. A proportioning valve comprising a cylinder closed at one end and provided at its opposite end with a mixture outlet, an air intake and a gas intake mounted on the wall of the cylinder, an air intake port leading from the air intake into the cylinder and a gas intake port leading from the gas intake into the cylinder, means movable in the cylinder and having a piston juxtaposed to the closed end of the cylinder, said piston being adapted to move in one direction due to pressure conditions created in said outlet and said means having a wall cooperating with the cylinder ports for controlling the volume of air and gas fed from the ports to the outlet, a rotatable liner cooperating with said wall and cylinder for varying the ratio of the air and gas passed through said ports, a spring for moving the piston in the opposite direction, and means for adjusting the tension of said spring.

16. A proportioning valve comprising a tubular casing having a mixture outlet, fluid admission ports on the casing, a rotatable liner in the casing, a partition extending across the casing, a volume sleeve in the casing at one side of said partition for controlling the volume of fluids entering said ports, a piston arranged at the opposite side of said partition and movable in one direction due to pressure differentials between the intake ports and the outlet, means for moving the piston in the opposite direction, means operatively connecting the piston and volume sleeve for causing the latter to be actuated by the piston, means for placing the spaces at opposite sides of the partition in communication, and means for rotating the liner for varying the ratio of the fluid entering said ports.

17. A proportioning valve comprising a tubular casing having one of its ends closed and its other end open to provide a mixture outlet, fluid admission ports on the casing between the closed end and said outlet, a rotatable liner in the casing, a partition extending across the casing, a volume sleeve in the casing at one side of said partition for controlling the volume of fluids entering said ports, a piston arranged at the opposite side of said partition and movable in one direction due to pressure differentials between the intake ports and the outlet, means for moving the piston in the opposite direction, means operatively connecting the piston and volume sleeve for causing the latter to be actuated by the piston, means for placing the spaces at opposite sides of the partition in communication, and means for rotating the liner for varying the ratio of the fluid entering said ports, the means operatively connecting the volume sleeve and piston comprising a piston rod guided by said partition.

18. A proportioning valve comprising a tubular casing having one of its ends closed and its other end open to provide a mixture outlet, fluid admission ports on the casing between the closed end and said outlet, a rotatable liner in the casing provided with a partition, a volume sleeve in the casing at one side of said partition for controlling the volume of fluids entering said ports, a piston arranged at the opposite side of said partition and movable in one direction due to pressure differentials between the intake ports and the outlet, means for moving the piston in the opposite direction, means operatively connecting the piston and volume sleeve for causing the latter to be actuated by the piston, means for placing the spaces at opposite sides of the partition in communication, and means for rotating the liner for varying the ratio of the fluid entering said ports, the means operatively connecting the volume sleeve and piston comprising a piston rod guided by said partition and loosely connected with the volume sleeve.

19. A proportioning valve comprising a cylinder having air and gas inlet ports and a mixture outlet port therein, a piston member and a liner member, one of said members being movable axially of the cylinder and the other being movable rotatably about said axis, the movement of one of said members regulating the ratio of air and gas passing through the air and gas ports, and the movement of the other member regulating the volume of air and gas passing to the outlet port, and means for establishing differential pressures at opposite sides of the piston member for controlling the movement of said piston member.

20. A proportioning valve comprising a cylinder having air and gas inlet ports and a mixture outlet, a piston member movably mounted in the cylinder, a control member, one of said members being movable axially of the cylinder and the other being movable rotatably about said axis, the movement of one of said members regulating the ratio of air and gas passing through the air and gas ports, and the movement of the other member regulating the volume of air and gas passing to the outlet, and means for establishing differential pressures at opposite sides of the piston member for controlling axial movement of said piston member.

ROSSWELL W. THOMAS.